United States Patent [19]

Hart et al.

[11] Patent Number: 5,344,858
[45] Date of Patent: Sep. 6, 1994

US005344858A

[54] COATING FROM PHOSPHATED EPOXY AND COOH-VINYL ADDITION RESINS

[75] Inventors: Terence J. Hart, Allison Park; Ellor J. Van Buskirk, Pittsburgh; Thomas R. Hockswender, Allison Park, all of Pa.

[73] Assignee: PPG Industries, Inc., Pittsburgh, Pa.

[21] Appl. No.: 68,264

[22] Filed: May 28, 1993

Related U.S. Application Data

[63] Continuation of Ser. No. 939,026, Sep. 1, 1992, abandoned, which is a continuation of Ser. No. 663,756, Mar. 1, 1991, abandoned, which is a continuation of Ser. No. 271,473, Nov. 15, 1988, abandoned, which is a continuation of Ser. No. 873,025, Jun. 11, 1986, abandoned, which is a continuation of Ser. No. 649,090, Sep. 10, 1984, abandoned.

[51] Int. Cl.$^5$ .................... C08K 3/20; C08L 63/02; C08L 33/02
[52] U.S. Cl. .................... 523/411; 523/409; 523/412; 525/109; 525/110; 525/111; 525/115; 525/207; 525/208
[58] Field of Search .................... 523/409, 411, 412; 525/109, 110, 111, 115, 119, 207, 208

[56] References Cited

U.S. PATENT DOCUMENTS

| | | | |
|---|---|---|---|
| 4,059,550 | 11/1977 | Shimp | 523/404 |
| 4,335,829 | 6/1982 | Christenson et al. | 525/119 |
| 4,461,857 | 7/1984 | Sekmakas et al. | 523/414 |
| 4,638,020 | 1/1987 | Christenson et al. | 523/406 |

FOREIGN PATENT DOCUMENTS

| | | |
|---|---|---|
| 0032554 | 7/1981 | European Pat. Off. . |
| 144872 | 6/1985 | European Pat. Off. . |
| 58-5377 | 1/1983 | Japan . |
| 58-191764 | 11/1983 | Japan . |

*Primary Examiner*—Robert E. Sellers
*Attorney, Agent, or Firm*—Dennis G. Millman

[57] ABSTRACT

A composition useful as an aqueous anionic electrodepositable coating comprises a film-former of from about 67–95% by weight of a phosphated polyepoxide resin, from about 5–33% by weight of a carboxyl group-containing vinyl addition resin, and up to about 40% by weight of the film-former of a crosslinking agent.

16 Claims, No Drawings

COATING FROM PHOSPHATED EPOXY AND COOH-VINYL ADDITION RESINS

This application is a continuation of application Ser. No. 939,026, filed Sep. 1, 1992, which is a continuation of application Ser. No. 663,756, filed Mar. 1, 1991, which is a continuation of application Ser. No. 271,473, filed Nov. 15, 1988, which is a continuation of application Ser. No. 873,025, filed Jun. 11, 1986, which is a continuation of application Ser. No. 649,090, filed Sep. 10, 1984, all now abandoned.

BACKGROUND OF THE INVENTION

1. Field of the Invention

The present invention relates to resinous blends of phosphated epoxy resins and solution-based acrylic resins. More specifically, the present invention relates to coating compositions comprising blends which have been found to be very suitable for can or coil coatings, particularly in the electrodeposition mode.

2. Brief Description of the Prior Art

Resinous blends containing acrylic and/or epoxy resins are generally known in the art. Generally, resinous blends are limited in their use because of problems of incompatibility.

In the area of can and coil coatings, the art has disclosed the use of resinous blends. For example, the art has disclosed a method for coil coating by means of electrodeposition comprising passing a flat metal sheet in an electrodeposition bath comprising, for example, a water-soluble resinous coating material and a water-insoluble emulsified resinous material. However, many of the electrodepositable compositions in the area of can or coil coatings do not give commercially usable coatings. Electrodeposition of many coatings even where successful is attended by shortcomings pertinent among which is discontinuity of coatings, particularly those formed over short deposition times of about 1 to 10 seconds.

In the area of can coatings in particular, these shortcomings are unacceptable. Coatings intended for use in food and beverage industries must meet stringent requirements in order to be useful for this purpose. The coating must be continuous, adhere well to the base metal and must possess a certain set of flexibility, extensibility and adhesion characteristics so as to withstand the processing of the container itself. The coating must also be able to resist heat which can be encountered during processing of the container. Additionally, the coating itself must not affect the taste of a food or beverage which is put into the coated container.

Many art-known electrocoats and processes thereof have not met the stringent requirements well. By the present invention, there is provided a resinous blend which can be used in can and/or coil coatings.

SUMMARY OF THE INVENTION

The present invention encompasses a coating composition comprising as a film-former:
(a) a blend of:
 (i) from about 50 to 95 percent by weight of an ungelled phosphated epoxy which is derived from reacting a 1,2-epoxy group of a polyepoxide resin with a phosphoric acid in a ratio of 0.1 to 1 mole of phosphoric acid per an equivalent of epoxy group; and
 (ii) from about 5 to 50 percent by weight of an acid group-containing resin having an acid value of 20 to 350, which resin is different from the resin of (i).

The coating compositions are preferably water-based, wherein the blends are base-neutralized.

The coating composition is particularly useful as an anionic electrodepositable composition comprising as a film-former:
(a) an aqueous dispersion of a base-neutralized blend of:
 (i) from about 50 to 95 percent by weight of an ungelled phosphated epoxy which is derived from reacting a 1,2-epoxy group of a polyepoxide resin with phosphoric acid in a ratio of about 0.1 to 1 mole of phosphoric acid per an equivalent of epoxy group; and
 (ii) from about 5 to 50 percent by weight of an acid group-containing resin having an acid value of 20 to 350, which resin is different from the resin of (i).

The percent by weight is based on the weight of (i) and (ii), and the acid value is based on that of the respective resin solids.

The acid group-containing resins described herein are preferably vinyl addition resins.

In the practice of this invention, the coating compositions usually contain curing agents such as aminoplasts. The coatings obtained therefrom have excellent film properties such as enamel rating, chemical resistance, durability and other desirable film properties.

DETAILED DESCRIPTION OF THE INVENTION

The phosphated epoxy useful here is ungelled and is prepared as follows. Typically, the preparation entails reacting a polyepoxide resin with phosphoric acid or an equivalent thereof.

The polyepoxide resin useful herein is a compound or a mixture of compounds having more than 1.0 epoxy groups per molecule. Several polyepoxide resins are known, examples of which can be found in the HANDBOOK OF EPOXY RESINS, Lee and Neville, 1967, McGraw-Hill Book Company.

A preferred class of polyepoxides are the polyglycidyl ethers of polyphenols, such as bisphenol A. These are produced by etherification of a polyphenol with epichlorohydrin in the presence of an alkali. The phenolic compound can be 1,1-bis(4-hydroxyphenyl)ethane; 1,1-bis(4-hydroxyphenyl)isobutane; 2,2-bis(4-hydroxytertiarybutylphenyl)propane; bis(2-hydroxynaphthyl)methane; 1,5-dihydroxynaphthalene; and 1,1-bis(4-hydroxy-3-allylphenyl)ethane. Another quite useful class of polyepoxides are produced similarly from polyphenol resins.

Also suitable are the similar polyglycidyl ethers of polyhydric alcohols which are derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, and 2,2-bis(4-hydroxycyclohexyl)propane.

Cycloaliphatic polyepoxide resins can also be used. Such resins are prepared by epoxidation of cyclic olefins with organic peracids, e.g., peracetic acid.

Another useful class of polyepoxides are those containing oxyalkylene groups in the epoxy molecule. Such oxyalkylene groups are typically groups of the general formula:

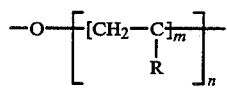

wherein R is hydrogen or alkyl, preferably lower alkyl (e.g., having 1 to 6 carbon atoms) and where, in most instances, m is 1 to 4 and n is 2 to 50. Such groups can be pendent to the main molecular chain of the polyepoxide or part of the main chain itself. The proportion of oxyalkylene groups in the polyepoxide depends upon many factors, including the chain length of the oxyalkylene group, the nature of the epoxy and the degree of modification desired.

In addition to the polyepoxide resins described above, addition polymerization polymers containing pendent epoxy groups can also be utilized in this invention. Such polymers are made by copolymerizing a wide variety of polymerizable vinyl monomers including monomers such as glycidyl acrylate and glycidyl methacrylate. Suitable vinyl monomers include those which do not contain a group reactive with the epoxy group and preferably include the alpha, beta-ethylenically unsaturated carboxylic acid esters of saturated alcohols containing from 1 to 8 carbon atoms and the monovinyl aromatic monomers of the benzene class, e.g., styrene and vinyl toluene.

Hydantoin-based polyepoxide resins as described in U.S. Pat. No. 4,110,287, issued Aug. 29, 1978 to Bosso and Castellucci, and in an article in Die Angewandte Makromolekulare Chemie, by Jurgen Habermeier, Vol. 63, (1977), pages 63–104 (the disclosures of which are hereby incorporated by reference), can also be used.

The preferred polyepoxide resin has an epoxy equivalent of about 170 to 5000 and preferably 850 to 3000.

As above indicated, the polyepoxide resin is reacted with a phosphoric acid. The phosphoric acid can be a 100 percent orthophosphoric acid or the aqueous solutions thereof such as 85 percent phosphoric acid aqueous solution. Other forms of the phosphoric acid such as superphosphoric acid, diphosphoric acid and triphosphoric acid can be used. Also, the polymeric or partial anhydrides of the phosphoric acids can be used.

Typically useful herein are aqueous phosphoric acids which are of about 70 to 90 percent and preferably about 85 percent phosphoric acid. The ratio of reactants is about 0.1 to 1 mole and preferably 0.1 to 0.5 mole of phosphoric acid per an equivalent of an epoxy group. The method of preparing the phosphated epoxy is known in the art.

In the present embodiments of the invention, the resultant phosphated epoxy is neutralized with a base before it is blended. Suitable bases include ammonia and primary, secondary or tertiary amines, e.g., ethanolamine, diethanolamine, N-methylethanolamine, dimethylethanolamine; isopropanolamine, diisopropanolamine, methylamine, ethylamine, diethylamine, trimethylamine, triethylamine and morpholine.

A solvent or mixture of solvents is preferably included in the reaction of the epoxy resin and phosphoric acid for the purpose of achieving better reaction control. Any non-reactive solvent can be used, examples of which include the ketones, ethers and alcohols. Specific examples of suitable solvents are methyl ethyl ketone, methyl butyl ketone, ethanol, propanol, isopropanol and butanol.

The preferred acid group-containing resins are vinyl addition resins which have an acid value of from about 20 to about 350, preferably from about 45 to about 150. These resins can be formed by polymerizing from about 5 percent to about 25 percent of an alpha, beta-ethylenically unsaturated carboxylic acid with from about 75 percent to about 95 percent of at least one copolymerizable vinyl monomer. Preferred vinyl addition resins are formed from about 7 percent to about 15 percent of the alpha, beta-ethylenically unsaturated carboxylic acid and from about 85 percent to about 93 percent of the copolymerizable vinyl monomer. Examples of suitable alpha, beta-ethylenically unsaturated carboxylic acids are those containing from 3 to 8 carbon atoms such as acrylic acid and methacrylic acid, both of which are preferred. Acids such as itaconic acid, maleic acid, fumaric acid, mono-esters of unsaturated dicarboxylic acids, e.g., methyl hydrogen maleate and ethyl hydrogen fumarate as well as anhydrides thereof where they exist, can also be used.

The copolymerizable vinyl monomer is selected from a wide variety of materials depending upon the properties desired. For example, at least a portion of the other copolymerizable monomer can be a vinyl compound such as ethylene or propylene, a vinyl aromatic compound such as styrene, alpha-methyl styrene, tertiary butylstyrene, vinyltoluene and vinylxylene. Such monomers are preferred because of their good water and pasteurization resistance. Other monomers which are used are the alkyl esters of methacrylic acid which contain from 1 to 3 carbon atoms in the alkyl group. Specific examples of such esters are methyl methacrylate and ethyl methacrylate. Monomers which can be used and which provide flexibility to the coating are the alkyl esters of acrylic acid having from 2 to 12 carbon atoms in the alkyl group and alkyl esters of methacrylic acid having from 4 to 12 carbon atoms in the alkyl group. Examples of monomers of this type are ethyl acrylate, propyl acrylate, butyl acrylate, hexyl acrylate, 2-ethylhexyl acrylate, butyl methacrylate, and 2-ethylhexyl methacrylate.

Preferably, at least one of the copolymerizable monomers is an ethylenically unsaturated monomer containing an N-(alkoxymethyl)amide. Examples thereof are N-(alkoxymethyl)acrylamides and N-(alkoxymethyl)methacrylamides having 1 to 4 carbon atoms in the alkoxy group. N-methylolacrylamide and N-(methylol)methacrylamide can also be used.

Still other monomers include the vinyl halides, vinylidene halides, vinyl versatate, vinyl acetate, dialkyl maleate, allyl chloride, allyl alcohol, 1,3-butadiene, 2-chlorobutene, methyl vinyl ether, acrylamide, methacrylamide, acrylonitrile, and methacrylonitrile. Mixtures of any of the above-described vinyl monomers can be used.

Mixtures of vinyl addition resins formed separately from different monomers can also be used. A preferred mixture is based on a blend of (a) a vinyl addition resin formed from an alpha, beta-ethylenically unsaturated carboxylic acid and a copolymerizable vinyl monomer wherein at least one of the vinyl monomers is N-(alkoxymethyl)acrylamide and (b) a vinyl addition resin formed from an alpha, beta-ethylenically unsaturated carboxylic acid and a copolymerizable vinyl monomer wherein at least one of the vinyl monomers is N-methylolacrylamide. The ratio of resin (a) to resin (b) ranges from about 1:19 to about 19:1, preferably from about 1:10 to about 10:1. A particularly preferred N-(alkoxymethyl)acrylamide useful in forming resin (a) is N-(ethoxymethyl)acrylamide or N-(butoxymethyl)acrylamide.

Vinyl addition resins described above can be prepared by free radical initiated polymerization of a mixture of the copolymerizable acrylic monomers by solution polymerization techniques. Usually, the monomers are dissolved in a solvent or a mixture of solvents and polymerized until the free monomeric content is reduced to below about 0.5 percent, preferably below about 0.1 percent. Examples of free radical initiators include azobis(alpha-gamma)-dimethylvaleronitrile, tertiary-butyl perbenzoate, tertiary-butyl peracetate and benzoyl peroxide.

Solvents which can be used in the polymerization step include alcohols much as ethanol, tertiary butanol, tertiary amyl alcohol; ketones such as acetone, methyl ethyl ketone; and ethers such as the dimethyl ether of ethylene glycol. Usually, the solvent is first heated to reflux and a mixture of the monomers and the free radical initiator are added simultaneously and slowly to the refluxing solvent. Additional catalyst is optionally added and the reaction mixture held at polymerizing temperatures so as to reduce the free monomer content of the reaction mixture.

Other acid group-containing resins having acid values of about 20 to 350 which are compatible with the phosphated epoxy resin in forming and using the resinous blends in accordance with this invention are also encompassed hereby.

In the present embodiments of the invention, the resultant vinyl addition resin is neutralized at least partially with a base before it is blended. Suitable bases include ammonia and primary, secondary or tertiary amines, e.g., ethanolamine, diethanolamine, N-methylethanolamine, dimethylethanolamine, methylamine, ethylamine, diethylamine, trimethylamine, triethylamine and morpholine.

The resinous blends have from about 5 percent to about 50 percent vinyl addition resin and from about 50 percent to about 95 percent of the phosphated epoxy resin. The solids content of the compositions range from about 20 percent to about 60 percent with the balance of the composition comprising water, organic solvent, or a mixture of water and organic solvent. Compositions wherein water is the major liquid carrier are preferred.

It is often desirable in order to get a more durable film to add an external crosslinking agent to the above-described coating compositions. Examples thereof include the aminoplast resins, phenolplast resins, and blocked polyisocyanate resins. The level of crosslinking agent used as part of the film-forming resin ranges up to about 40 percent, and is preferably from about 5 percent to about 20 percent of the film-forming resin. While vinyl addition resins derived from N-alkoxymethylmethacrylamide and N-alkoxymethylacrylamide are capable of crosslinking without an external crosslinking agent, such agents can, nevertheless, still be added.

Aminoplast resins are the condensation products of an aldehyde, e.g., formaldehyde, acetaldehyde, crotonaldehyde, and benzaldehyde with an amino- or amido group-containing substance, e.g., urea, melamine, and benzoguanamine. Products obtained from the reaction of alcohols and formaldehyde with melamine, urea or benzoguanamine are preferred in the aqueous-based coating compositions because of their good water dispersibility. Useful alcohols used to make the etherified products are the monohydric alcohols, such as methanol, ethanol, propanol, butanol, hexanol, benzyl alcohol, cyclohexanol, and ethoxyethanol. An etherified melamine-formaldehyde resin is the preferred aminoplast resin. U.S. Pat. No. 4,075,141, Porter et al, Feb. 21, 1978, contains a description of useful aminoplast resins and is incorporated herein by reference.

Phenolic resins include the condensation product of an aldehyde with a phenol. Formaldehyde and acetaldehyde are preferred aldehydes. Various phenols can be usd, e.g., phenol per se, cresol, p-phenylphenol, p-tert-butylphenol, p-tert-amylphenol and cyclopentylphenol. The methylolphenol ethers described in U.S. Pat. No. 2,597,330 (herein incorporated by reference) are especially useful.

A number of blocked polyisocyanates are satisfactory crosslinking agents. These agents are well known in the art. Generally, the organic polyisocyanates are blocked with a volatile alcohol, epsilon-caprolactam or ketoxime. These blocked polyisocyanates become unblocked at elevated temperatures, e.g., above about 100° C. "The Chemistry of Organic Film Formers", Robert E. Kreiger Pub. Co., copyrighted 1977, by D. H. Solomon, pages 216–217, contains a description of many blocked isocyanates that can be used here. The disclosure of this publication is herein incorporated by reference.

The ratio of the vinyl resin to the phosphated epoxy resin will vary depending on the nature of the resins and the type of coatings desired. In general, on the basis of resin solids of the blend, from about 5 to 95 percent and preferably from about 10 to 50 percent of the vinyl resin and the remainder is the phosphated epoxy resin. In any case, the vinyl resin must be compatible with the phosphated epoxy resin. That is, both resins must be capable of being coated out. The resinous blend must be compatible with water, i.e., it must be stable or capable of being stabilized in water without settling out to a point where the water-based composition loses its efficacy as a film-former. Preferably, the resinous blend must remain dispersed or solubilized during coating.

In adapting the resinous blend to water-based compositions useful herein, the resinous blend can be further neutralized with a base. The bases useful herein can be organic or inorganic. Illustrative examples of the bases are ammonia, monoalkylamines, dialkylamines, or trialkylamines such as ethylamine, propylamine, dimethylamine, dibutylamine and cyclohexylamine; monoalkanolamine, dialkanolamine or trialkanolamine such as ethanolamine, diethanolamine, triethanolamine, propanolamine, diisopropanolamine, dimethylethanolamine and diethylethanolamine; morpholine, e.g., N-methylmorpholine or N-ethylmorpholine. The percent of neutralization is such as would make the resinous blends water-dispersible and electrophoretic. Typically, the resinous blend is at least partially neutralized from about 40 to 150 percent and preferably 60 to 100 percent neutralization.

The coating compositions of this invention may contain other optional components such as pigments, fillers, anti-oxidants, flow control agents, surfactants and the like. The coating composition can be applied by electrophoretic and non-electrophoretic means.

The electrodepositable compositions of this invention typically have a resin solids content of 2 to 20 percent and preferably 5 to 15 percent. In general, the electrodeposition bath has an operating bath conductivity within 200 to 3000 micromhos and preferably within the range of 600 to 1200 micromhos. The residence time of the substrate being coated in the bath is, in general, from about 0.1 to 10, preferably 0.5 to 5 seconds. The substrates that can be electrocoated are, generally, electroconductive substrates. In can coatings, the substrates are typically aluminum substrates.

In general, bath variables can be adjusted so as to vary coating thickness. As afore-stated, in interior can coatings, thin films are required. Hence, film thickness in this area is in the range of about 0.01 to 1.0 and preferably 0.1 to 0.5 mil.

After electrocoating, the substrate is removed and then baked in an oven at temperatures and over a period sufficient to effect cure thereof. Typically, the coated substrate is baked at temperatures of about 200° to 250° C. for about 10 seconds to 4 minutes or more.

The following are non-limiting examples of the invention that are intended to be illustrative as opposed to limiting the invention as claimed herein.

EXAMPLE I

A resinous blend of the present invention was prepared and used as follows,

Part 1

An acid group-containing vinyl addition resin was prepared as follows,

| Ingredients | Parts by Weight (grams) |
|---|---|
| Reactor Charge | |
| 2-Ethylhexanol | 2500.0 |
| Deionized water | 125.0 |
| Initiator Charge | |
| Benzoyl peroxide | 93.8 |
| Toluene | 200.0 |
| Methyl ethyl ketone | 250.0 |
| Monomer Mix Charge | |
| Ethyl acrylate | 2550.0 |
| Styrene | 450.0 |
| Methacrylic acid | 375.0 |
| N-ethoxymethylacrylamide (36% solution in ethanol) | 1042.0 |
| Rinse | |
| 2-Ethylhexanol | 28.0 |
| Initiator (Scavenger) Charge | |
| Benzoyl peroxide | 36.0 |
| Methyl ethyl ketone | 195.0 |

The Reactor Charge was heated to reflux. The Initiator Charge and the Monomer Charge were added over a period of 3 hours at a temperature range of 103°–90° C. With the addition completed and over a temperature range of 90°–91° C., the rinse was added followed by addition of the Initiator (Scavenger) Charge in three equal portions. After each addition, the reaction mixture was held for 1½ hours. The resultant mixture was then cooled and stored.

Analysis: Milliequivalents of acid of 0.602 and percent solids of 46.5.

An aqueous dispersion of the above vinyl addition resin was prepared as follows.

| Ingredients | Parts by Weight (grams) |
|---|---|
| The above vinyl addition resin | 425 |
| Dimethylethanolamine | 22.8 |
| Deionized water | 540.5 |

The above polymer was introduced into a properly equipped reaction vessel. Thereafter, the dimethylethanolamine was introduced into the vessel which was heated to 70°–72° C. and held for 15 minutes. The deionized water was then introduced into the vessel to disperse the resultant reaction mixture to a solids content of 20 percent.

Part 2

This illustrates a method of preparing the phosphated epoxy of this invention, The following were used in the preparation,

| Ingredients | Parts by Weight (grams) |
|---|---|
| Charge I | |
| EPON 1007[1] | 1152.5 |
| Butyl CELLOSOLVE[2] | 403.7 |
| Charge II | |
| Superphosphoric acid (105%) | 13.2 |
| 2-Butoxyethanol | 26.5 |
| Charge III | |
| Deionized water | 30.2 |
| Charge IV | |
| Butanol | 260.7 |
| Charge V | |
| Dimethylethanolamine | 18.1 |
| Charge VI | |
| Deionized water | 1980.8 |

[1] An epoxy resin having an epoxy equivalent of 1847 which is available from Shell Chemical Company.
[2] 2-Butoxyethanol.

Charge I was introduced into a properly equipped reaction vessel and heated to 140° C. to dissolve. At 120° C., Charge II was added and the reaction mixture was held for 30 minutes at 120°–130° C. Charge III was added and the reaction mixture was refluxed for about 2 hours at 110°–115° C. Thereafter and at 114° C., Charge IV was added. Following this and at 97° C., Charge V was added. Thereafter, Charge VI was added over a period of 30 minutes while the reaction mixture was being stirred. 647.7 grams of additional water was added to the reaction mixture.

Analysis: Viscosity was 586 centipoise at 50 rpm with a No. 4 spindle, pH was 7.65, solids content was 30.4, milliequivalents of acid was 0.067 and milliequivalents of base was 0.050.

Part 3

A resinous blend of this invention was prepared as follows.

| Ingredients | Parts by Weight (grams) |
|---|---|
| The vinyl addition resin of Part 1 | 250 |
| The phosphated epoxy of Part 2 | 328.9 |
| CYMEL 1116[3] | 7.8 |
| Deionized water | 913.3 |

[3] Melamine-formaldehyde resin, available from American Cyanamid Company.

The above ingredients were thoroughly blended to produce a resinous blend laving a solids content of 9.4 percent, milliequivalents of acid of 0.53 and milliequivalents of base of 0.44.

An electrodepositable composition of the above resinous blend was prepared with a bath conductivity of 1200 micromhos per centimeter. This was used to coat aluminum cans at 175 volts for 2 seconds at a temperature of 27° C. The coated cans had films of 7 milligrams per square inch, having good film properties.

EXAMPLE II

This example further illustrates the resinous blends of the invention and methods of preparing and using same.

Part 1

This illustrates the phosphated epoxy resin and a method of preparing same.

| Ingredients | Parts by Weight (grams) |
|---|---|
| Charge I | |
| EPON 1009[1] | 1152.5 |
| Butyl CELLOSOLVE[2] | 403.7 |
| Charge II | |
| Superphosphoric acid (105%) | 8.4 |
| Butyl CELLOSOLVE | 26.5 |
| Charge III | |
| Deionized water | 19.4 |
| Charge IV | |
| Butanol | 260.7 |
| Charge V | |
| Dimethylethanolamine | 11.5 |
| Charge VI | |
| Deionized water | 1542.0 |

[1] An epoxy resin having an epoxy equivalent of 2883; available from Shell Chemical Company.
[2] 2-Butoxyethanol.

The phosphated epoxy was prepared in essentially the same manner as described in Example I, Part 2.

Analysis: 34.4 percent solids content, milliequivalents of acid was about 0.053 (calculated) and milliequivalents of base was about 0.038 (calculated).

Part 2

The above phosphated epoxy resin was blended with and formulated into a coating composition with an aqueous dispersion of an acid group-containing vinyl addition resin which was the same as described in Example I, Part 1, and with other ingredients as listed below.

| Ingredients | Parts by Weight (grams) |
|---|---|
| The phosphated epoxy resin of Part 1 | 294.1 |
| CYMEL 1116 | 7.8 |
| The vinyl addition resin of Example I, Part 1 | 250 |
| Deionized water | 972.0 |

The resultant coating composition was employed in electrocoating aluminum substrates at 10 percent solids content, voltage of 230 volts for 2 seconds, at a bath conductivity of 1380 micromhos per centimeter at 27° C. Films of 0.29 mil in thickness were obtained. The films were baked at 205° C. for 4 minutes to produce coatings with good appearance, chemical resistance and excellent enamel rating.

EXAMPLE III

This example was essentially the same as Example I except for tile proportions in which the phosphated epoxy resin and an aqueous dispersion of an acid group-containing vinyl addition resin were employed.

The following were used in the preparation.

| Ingredients | Parts by Weight (grams) |
|---|---|
| The phosphated epoxy resin from Part 2 of Example I | 456.4 |
| CYMEL 1116 | 7.8 |
| The acid-containing vinyl addition resin | 75.0 |
| Water | 960.8 |

The resultant coating composition was employed in electrocoating aluminum substrates. An electrocoating bath with the coating composition having a solids content of 10 percent, bath conductivity of 860 micromhos per centimeter, with a voltage of 250 volts for 2 seconds at 27° C. produced films of 0.24 mil. The films were baked at 205° C. for 4 minutes to produce coatings with good appearance, chemical resistance and excellent enamel rating.

EXAMPLE IV

This example further illustrates the resinous blends of the invention and methods of preparing and using same.

Part 1

A phosphated epoxy resin was prepared as follows:

| Ingredients | Parts by Weight (grams) |
|---|---|
| Charge I | |
| EPON 1007 | 800.0 |
| Butyl CELLOSOLVE | 280.2 |
| Charge II | |
| Phosphoric acid (85% aqueous solution) | 8.8 |
| Butyl CELLOSOLVE | 14.2 |
| Charge III | |
| Deionized water | 16.2 |
| Charge IV | |
| Butanol | 140.0 |
| Charge V | |
| Dimethylethanolamine | 9.7 |
| Charge VI | |
| Deionized water | 986.5 |

The method of preparation was essentially the same as described in Example I, Part 2. To the resultant phosphated epoxy resin was added additional 191 grams of deionized water to adjust its solids content to approximately 33 percent. Milliequivalents of acid was 0.045 and milliequivalents of base was 0.045 and solids content at 150° C. was 35.2 percent.

Part 2

A base-neutralized vinyl addition resin was prepared as follows.

516.1 grams of the vinyl addition resin of Example I, Part 1 was neutralized with 41.2 grams of diisopropanolamine and reduced with 642.7 grams of water.

Part 3

The resins of Parts 1 and 2 above were blended and formulated into a coating composition with other ingredients as listed below.

| Ingredients | Parts by Weight (grams) |
|---|---|
| The phosphated epoxy resin | 303 |
| CYMEL 1116 | 7.8 |
| The base-neutralized vinyl addition resin | 250 |
| Water | 939.2 |

The resultant coating composition was employed in electrocoating aluminum substrates as follows. In a bath containing the coating composition at 10 percent total solids, conductivity of 900 micromhos per centimeter, at 27° C. and voltage of 260 volts for 2 seconds, there was produced an electrocoated substrate having a film thickness of 0.35 mil. Upon baking, there were obtained coatings with good appearance, chemical resistance and excellent enamel rating.

EXAMPLE V

The following further illustrates the coating compositions of this invention and methods of making and using same.

An acid group-containing vinyl addition resin was prepared as follows.

Part 1

| Ingredients | Parts by Weight (grams) |
| --- | --- |
| Reactor Charge | |
| 2-Ethylhexanol | 1000.0 |
| Deionized water | 50.0 |
| Initiator Charge | |
| Benzoyl peroxide | 30.0 |
| Toluene | 150.0 |
| Methyl ethyl ketone | 10.0 |
| Monomer Mix Charge | |
| Ethyl acrylate | 1020.0 |
| Styrene | 180.0 |
| Methacrylic acid | 150.0 |
| 36% solution of N-ethoxymethylacrylamide | 417.0 |
| Rinse | |
| 2-Ethylhexanol | 11.2 |
| Initiator (Scavenger) Charge | |
| Benzoyl peroxide | 14.4 |
| Methyl ethyl ketone | 75 |

The Reactor Charge was heated to reflux. The Initiator Charge and the Monomer Mix Charge were added over a period of 3 hours at a temperature of 99°–102° C. With the addition complete, the Rinse was added, followed by the Initiator (Scavenger) Charge in three equal portions. After each addition, the reaction mixture was held for 1½ hours at 100°–102° C. The resultant mixture was then cooled and stored.

An aqueous dispersion of the above resin was prepared as follows.

| Ingredients | Parts by Weight (grams) |
| --- | --- |
| The above acrylic resin | 300 |
| Dimethylethanolamine | 18.6 |
| Deionized water | 431 |

Part 2

This illustrates a method of preparing the phosphatized epoxy of this invention.

| Ingredients | Parts by Weight (grams) |
| --- | --- |
| Charge I | |
| D.E.R. 667[1] | 1237.5 |
| Butyl CELLOSOLVE | 433.5 |
| Charge II | |
| Superphosphoric acid (105%) | 11.0 |
| Butyl CELLOSOLVE | 22.0 |
| Charge III | |
| Deionized water | 25.1 |
| Charge IV | |
| n-Butanol | 216.6 |
| Charge V | |
| Dimethylethanolamine | 15.0 |
| Charge VI | |

| Ingredients | Parts by Weight (grams) |
| --- | --- |
| Deionized water | 1530.0 |

[1] An epoxy resin having an epoxy equivalent of 2048, available from Dow Chemical Company.

Charge I was introduced into a properly equipped reaction vessel and heated to 143° C. to dissolve. At 125° C., Charge II was added and the reaction mixture held for 40 minutes at 120°–130° C. Charge III was added and the reaction mixture was refluxed for about 2 hours at 119°–120° C. Thereafter, at 114° C., Charge IV was added. Following this, and at 114° C., Charge V was added. Thereafter, Charge VI was added over a period of 45 minutes while the reaction mixture was being stirred. Analysis: Solids content was 37.8, milliequivalents of acid per gram were 0.062 and milliequivalents of base were 0.050 per gram.

ELECTROCOAT BATH

A resinous blend of this invention was prepared as follows.

| Ingredients | Parts by Weight (grams) |
| --- | --- |
| Phosphatized epoxy dispersion of Part 2 above | 390 |
| Deionized water | 150 |
| The aqueous dispersion of the resin in Part 1 above | 350 |
| CYMEL 1116 | 11.3 |
| Deionized water | 1599 |

The electrocoat bath had a particle size of 1100 Angstroms, a conductivity of 1100 μmhos, and a measured solids of 9.3 percent. The bath had 0.057 milliequivalents of acid per gram of sample and 0.051 milliequivalents of base.

Aluminum panels were immersed in the bath and potentials of 75, 100 and 125 volts applied for two seconds with the aluminum panels being the anode. After vigorous rinsing with deionized water, the deposited films had excellent wet adhesion. Hard, glossy, continuous films resulted from baking these panels at 204° C.

Aluminum panels were coated in the same electrocoat bath with a potential of 100 volts applied for two seconds, vigorously rinsed, and baked for 7 seconds to a 216° to 232° C. peak metal temperature. The resulting film was about 0.15 mil thick (2.5 milligrams of coating per square inch), had a pencil hardness of 2H, and did not blush or discolor when immersed in beer at 82° C. for 30 minutes. In a wedge bend test, the film showed good flexibility properties, as is manifested by copper sulfate failure to about 60 millimeters using optical magnification to find the end point.

What is claimed is:

1. A coating composition comprising as a film-former:
   (A) up to about 40 percent by weight of crosslinking agent based other than the vinyl addition resin on film-former resin content;
   (B) the remainder of the film former comprising a blend of:
      (i) from about 67 to 95 percent by weight based on resin solids of the blend of an ungelled phosphated epoxy which is derived from reacting a 1,2-epoxy group of a polyepoxide resin and a phosphoric acid in a ratio of 0.1 to 1 mole of a phosphoric acid per equivalent of the epoxy group; and (ii) from about 5 to 33 percent by weight based on resin solids of the blend of a vinyl addition resin which is derived from copolymerizing ethylenically unsaturated monomers, at least one of which is a carboxyl group-containing monomer, which has an acid value of from 20 to 350.

2. A coating composition of claim 1, wherein the polyepoxide resin is a polyglycidyl ether of a polyol which has an epoxy equivalent weight of 170 to 5000.

3. A coating composition of claim 2, wherein the epoxy equivalent weight is from about 850 to 3000.

4. A coating composition of claim 1, wherein at least one of the ethylenically unsaturated monomers contains an N-(alkoxymethyl)amide group.

5. A coating composition of claim 4 wherein the N-(alkoxymethyl)amide group-containing monomer is N-ethoxymethylacrylamide or N-butoxymethylacrylamide.

6. A coating composition of claim 1 wherein the crosslinking agent is an aminoplast, phenoplast or blocked polyisocynate.

7. An anionic electrodepositable composition comprising as a film-former:
(A) up to about 40 percent by weight of crosslinking agent based on film-former resin content;
(B) the remainder of the film former comprising an aqueous dispersion of a base-neutralized blend of:
(i) from about 67 to 95 percent by weight based on resin solids of the blend of an ungelled phosphated epoxy consisting essentially of a reaction product of a polyepoxide resin and a phosphoric acid in a ratio of 0.1 to 1 mole of phosphoric acid per equivalent of the polyepoxide epoxy group; and
(ii) from about 5 to 33 percent by weight based on resin solids of the blend of a vinyl addition resin which is derived from copolymerizing ethylenically unsaturated monomers, at least one of which is carboxy group-containing monomer, which has an acid value of from 20 to 350.

8. An electrodepositable composition of claim 7, wherein the polyepoxide resin has an epoxy equivalent weight of 170 to 5000.

9. An electrodepositable composition of claim 8, wherein the epoxy equivalent weight is 850 to 3000.

10. An electrodepositable composition of claim 7, wherein the base is diisopropanolamine or dimethylethanolamine.

11. A coating composition of claim 1 wherein the phosphated epoxy is derived from reacting the polyepoxide resin and the phosphoric acid in a ratio of 0.1 to 0.5 mole of phosphoric acid per equivalent of epoxy groups.

12. A coating composition of claim 10 wherein the phosphated epoxy is derived from reacting the polyepoxide resin and the phosphoric acid in a ratio of 0.1 to 0.5 mole of phosphoric acid per equivalent of epoxy groups.

13. A coating composition of claim 1 wherein the vinyl addition resin has an acid value of about 20 to about 350.

14. A coating composition of claim 1 wherein the vinyl addition resin has an acid value of about 45 to about 150.

15. A coating composition of claim 7 wherein the vinyl addition resin has an acid value of about 20 to about 350.

16. A coating composition of claim 7 wherein the vinyl addition resin has an acid value of about 45 to about 150.

* * * * *